Aug. 10, 1948.  H. G. DALEY ET AL  2,446,784
APPARATUS FOR MANUFACTURE OF SPHEROIDAL PARTICLES
Original Filed Feb. 25, 1943
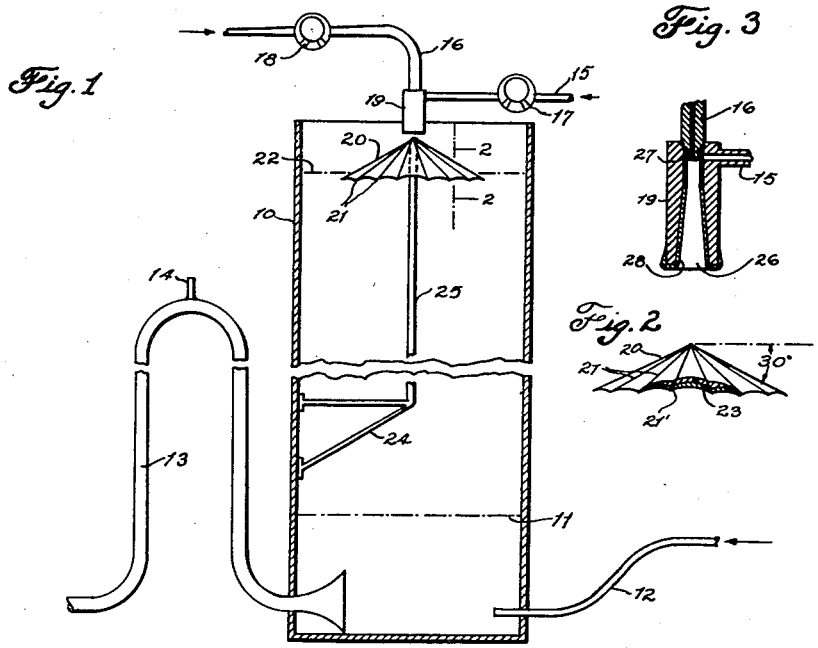
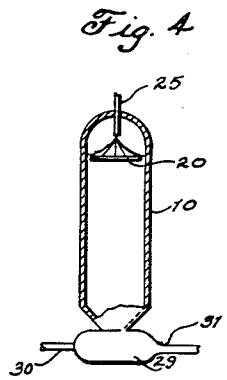
INVENTORS
John W. Payne
Edmund L. Sargent
Henry G. Daley
BY *Oswald G. Hayes*
ATTORNEY Patented Aug. 10, 1948

2,446,784

UNITED STATES PATENT OFFICE 2,446,784

APPARATUS FOR MANUFACTURE OF SPHEROIDAL PARTICLES

Henry G. Daley, Woodbury Heights, and John W. Payne and Edmund L. Sargent, Woodbury, N. J., assignors to Socony-Vacuum Oil Company, Incorporated, a corporation of New York Continuation of application Serial No. 477,168, February 25, 1943. This application October 19, 1945, Serial No. 623,362

3 Claims. (Cl. 18—2.4)

This invention relates to manufacture of spheroidal particles by introduction of a liquid stream of a material having the capacity of being converted from a liquid to a solid into a liquid medium in which that transition takes place. More particularly, the invention is concerned with a means for dividing a stream of relatively large volume into a number of streams of substantially equal volume and introducing those streams smoothly into the solidifying liquid medium.

It is well known in the art to form spheroidal particles in the general manner noted above. For example, spheroidal particles of organic gels are suitably prepared by injecting a liquid sol, such as glue or gelatin in water, into a body of cold oil. The aqueous sol separates into a plurality of globules in the oil because of the immiscibility of the two liquids and the globules assume spheroidal shape due to surface tension at the interface. Heat exchange between the sol and the oil is extremely rapid and the sol is rapidly cooled below its gelation point, being transformed to a solid gel due to cooling. Spheroidal particles of various organic substances can be prepared by introducing a solution into a liquid which causes precipitation of the organic material from the solution, an example is the process of Patent No. 1,827,931, Blankenstein.

Similarly, fusible solids are converted to spheroids by injecting the fused material into a cooling bath. For example, slag may be introduced into a molten bath of metal having a low melting point and a fairly low density e. g. magnesium and its alloys. Another example of a process to which the present invention is adapted is that described in application Serial No. 477,168 filed February 25, 1943 now abandoned of which the present application is a continuation-in-part. According to the process of that application an inorganic hydrosol is introduced to a body of a water immiscible liquid to separate therein to a plurality of globules which set upon the passage of a suitable period of time to firm inorganic hydrogels. The process of this invention is also applicable to setting of inorganic gels by chemical action. Thus, an alumina hydrosol, or any hydrosol which has been aged until it becomes highly viscous, may be introduced to an ammoniacal solution which causes very rapid gelation of the hydrosol into spheroidal particles. That process is described and claimed in co-pending application Serial No. 529,822 abandoned, filed April 6, 1944 and application Serial No. 556,632 filed September 30, 1944. The invention may also be utilized in forming pellets of sodium silicate by the process of Baker et al. Patent No. 2,284,248.

It is accordingly an important object of this invention to introduce a plurality of streams of liquid into a solidifying liquid by dividing a large stream into a number of small streams and introducing each of said small streams smoothly into a body of a liquid in which the treated stream sets to a solid. The essential feature of the invention is a conical divider having its apex directed to the source of supply of the liquid under treatment and having its base immersed in the solidifying liquid or at the surface of such liquid. Preferably, the divider is rigidly fixed in position, since any type of motion tends to disturb the several smooth streams desired. The liquid being treated is discharged upon the apex of the conical divider and is split into a number of substantially uniform streams each flowing down a groove in the surface of the divider to enter the solidifying liquid in a smooth and uniform manner. Similar division of the stream can be obtained by the use of a flat surface having grooves into which the stream is fed from a header or by moving a discharge outlet across the top of the grooves. The conical divider is, however, much more efficient and more free of operating difficulties.

The invention will be further understood by reference to the annexed drawings wherein:

Figure 1 is a sectional showing, partially diagrammatic, of apparatus for preparing spheroidal pellets and transferring such pellets to further treating stages;

Figure 2 is a vertical section on line 2—2 of Figure 1 illustrating construction of the divider according to one embodiment of the invention;

Figure 3 is a section through a mixing and feeding nozzle for preparing inorganic gel pellets; and Figure 4 is a sectional view of apparatus which can be used for high temperature operations.

The formation of inorganic oxide gel pellets is typical of the invention and certain embodiments are advantageously discussed in connection therewith.

In certain operations of this type, considerable difficulty is encountered due to the tendency of the colloidal solution to build up gel masses on the apparatus designed to supply the said solution, thus seriously affecting efficiency of the process. The problems of gel masses on the apparatus for supply of streams in a form to be broken up into globules are found to present serious difficulties in commercial operations of the present type. A typical example is the preparation of pellet form gel masses of silica and/or other metal oxides prepared for use as hydrocarbon conversion catalysts. The colloidal solution must be freshly prepared shortly before deposition in a gelling medium, such as oil. According to one embodiment of the process proposed in application Serial No. 461,454, filed October 9, 1942 by Milton M. Marisic, now Patent No. 2,385,217, dated September 18, 1945 two aqueous solutions are continuously mixed in a mixing nozzle above a body of oil and the colloidal solution thus formed is supplied to the oil at such rate that the stream will break up into globules of the desired size and gel in globular form. It is apparent that two metering pumps—or other means to supply liquid at a predetermined rate—will be required for each mixing nozzle. If substantially uniform size is desired in the finished pellets, the maximum rate of flow for colloidal solution is about 100 cc. per minute. For most purposes, considerable latitude in size of finished pellets is permissible, but at best, operation is unsatisfactory at feed rates in excess of 800 cc. per minute per nozzle. For a typical plant, it was calculated that about 8000 nozzles would be required for the production of 100 tons per day of dried silica-alumina gel pellets of uniform size. This would involve 16,000 metering pumps and corresponding quantities of piping, valves and other fittings. Further, the mixing nozzles, even though equipped with internal rotating members for continuous wiping of walls and outlet, tend to accumulate gel deposits which seriously hinder efficient operation.

We have now found that the number of nozzles may be greatly reduced, i. e., capacity of each nozzle multiplied, and the deposition of deleterious gel deposits on the apparatus inhibited by certain novel expedients. Briefly, the invention resides in the use of a stream divider to split the stream from the nozzle into a plurality of more or less equal lesser streams, said divider having a surface not wetted by the colloidal solution and having a plurality of channels radiating and sloping downwardly from the outlet of the nozzle. A conical divider is greatly preferred for its better division due to uniform nature of the channels but other solid and plane surfaces may have suitable channels formed therein to provide the dividing channels. The surface of the divider is preferably made up of a substance which is not wetted by the colloidal solution, for example, a wax. Preferred surface materials are the waxes having amorphous or micro-crystalline structure, such as cerese wax, beeswax, montan and carnauba. The waxes having macro-crystalline structure are less efficient, the action thereof seeming to indicate that there is some mechanical retention of small portions of colloidal solution by fissures between crystals. Such small portions may then gel on the surface of the divider and form focal points for building up substantial deposits of gel. Whatever may be the proper theoretical explanation, it has been found that macro-crystalline waxes, for example, the ordinary paraffin wax of commerce, do tend to accumulate gel deposits to a greater extent than the preferred waxes noted above, although much less than metallic surfaces, for example.

While many substances are suitable for forming the divider surface and reference to suitable handbooks will enable the man skilled in the art to select numerous substances suited to any specific need, we prefer waxes for use with aqueous solutions because of their high degree of non-wetting with most aqueous materials and the ease with which they may be worked. The use of a divider as described herein is contemplated as a part of the invention whether water repellent or wetted by water since many advantages of the invention may be obtained thereby but it must be recognized that any surface wetted by the colloidal solution will normally require frequent cleaning to be kept in working condition. Further, the gel adheres strongly to many surfaces wetted by the solution and renders efficient cleaning very difficult.

In order to utilize the invention to best advantage, it is also desirable that the mixing nozzle and all other solid surfaces with which the colloidal solution comes into contact before gelation be covered by or formed of a substance not wetted by the colloidal solution as discussed above in connection with the surface of the divider. For example, any gel deposits built up on the nozzle outlet will progressively grow in extent until contact is made with the surface of the divider. With this contact as a nucleus, a deposit will then be built up on the divider which will reduce efficiency of the divider and may, in extreme cases, render it completely inoperative. It will be readily apparent that proper coating of the nozzle, etc. will greatly reduce cleaning needs of the divider.

Referring to Figure 1, a body of liquid immiscible with, and lighter than, the colloidal solution is confined in a vessel 10 to provide a vertical column in which globules of colloidal solution set to a gel as they pass downwardly to a body of water or other suitable liquid below the interface indicated at 11. The gel pellets are removed and transferred for further processing, such as washing and drying, by a stream of liquid flowing in through pipe 12 and out through gooseneck 13 having a vent 14. The present invention is primarily concerned with the means for supplying colloidal solution in the form of globules, said means comprising supply pipes 15 and 16, metering pumps 17 and 18, mixing nozzle 19 and divider 20. Aqueous solutions capable of reacting to form the desired colloidal solution are fed through lines 15 and 16 in predetermined relative quantities by metering pumps 17 and 18 which may be slidable vane rotary pumps as indicated, or of any other suitable type. The two reactant solutions are intimately mixed in nozzle 19 and promptly discharged to the divider 20 which is preferably cone shaped.

The divider 20 has an upper surface formed with a plurality of grooves 21 radiating downwardly from its apex to provide a number of channels each of which carries a portion of the stream from nozzle 19 to the surface of the oil indicated at 22. The number of grooves and the slope of the cone are dependent to some extent on viscosity of the colloidal solution and degree of subdivision into globules desired. For most purposes we have found that from 20 to 30 grooves are desirable, smaller numbers giving lesser division and larger numbers resulting in less even division of the stream. About 25 grooves is the preferred number and we generally use 24 grooves since this number is the closest to 25 that permits of accurate formation easily; it being relatively simple to lay off 24 equal angles. A lesser number of grooves are shown in the drawing to simplify illustration. Steep pitches on the cone cause the colloidal solution to impinge on the oil surface at high speed, disturbing that surface and often causing occlusion of oil in the globules formed. Very shallow pitch results in slower flow and less uniform division of each individual stream into globules. We have found that a slope of about 30° from the horizontal is preferable for general purposes and, specifically, it is well adapted to use in preparing inorganic oxide gel pellets. In a highly satisfactory divider which has been used, the length of the conical divider side, from apex to edge, is about four inches.

In general, the increase in capacity by use of the present divider is of the same order as the number of streams provided thereby, but capacity is usually not directly proportional to the number of divisions. For example, the preferred conical divider of 24 grooves increases capacity about 20 times. Thus, where a single nozzle discharging directly to the gelling medium can handle about 100 cc. per minute in formation of uniformly-sized pellets or 800 cc. per minute in preparing pellets of non-uniform size; a combination of nozzle and conical divider having 24 grooves has comparable capacities of 2000 cc. and 16,000 cc. per minute, respectively.

Preferably all parts of the apparatus normally contacting colloidal solution, either as a stream or after separation into globules, is coated or formed of a substance not wetted by (i. e. repellent to) the colloidal solution. A typical divider is shown in Figure 2 as made up of a suitable supporting base 21', usually metal, overlaid by a surfacing material 23, preferably of wax. The divider is supported by a bracket 24 and rod 25 in the apparatus. It is better to place the bracket at such depth in the column of oil that globules coming in contact therewith will be gelled. If desired, it may be at a higher level, in which case it is also preferably coated as is the surface of the divider. It must be recognized that a bracket tends to break and/or distort ungelled globules falling against it.

Wax or other non-wetted surface coating in those parts of the nozzle contacted by the colloidal solution permits elimination of the rotary wipers usually required for this type of mixing device. The nozzle shown in Figure 3 is formed to provide a channel 26 into which the streams of reactant solutions from lines 15 and 16 are discharged for mixing. One suitable mixing arrangement is to discharge one of the reactant streams at high velocity from a jet, such as tip 27 on pipe 16. This insures rapid and complete mixing at the confluence of the reactant streams. Below the mixing zone, the channel 26 diverges in order that the colloidal solution shall be discharged from the nozzle at relatively low velocity to inhibit spattering and the like, and provide smooth division on the divider 20. The interior of the channel 26 is lined by a coating 28 of wax or the like, and this coating may be advantageously continued across the end of the nozzle and up the outside for a short distance as shown. Tip 27 will also be given a light wax coating as will all surfaces in the nozzle which contact colloidal solution.

In a typical example, gel pellets for use as catalysts for the cracking of hydrocarbon vapors were prepared from reactant solutions containing silicon and aluminum compounds. A solution of sodium silicate containing 105 grams of $SiO_2$ per liter was prepared by diluting "N" brand sodium silicate (28.7% $SiO_2$, 8.9% $Na_2O$). This solution was continuously mixed in mixing nozzle 19 with a second solution containing 34.10 grams of $Al_2(SO_4)_3$ and 25.05 grams of $H_2SO_4$ per liter in the ratio of 1.00 volume of the former solution to 0.780 volume of the latter. The resulting colloidal solution was discharged at the rate of about 16 liters per minute to a 24 groove conical divider as described above, from which it entered the top of a column of gas oil. The globules of solution fell through the oil and gelled before passing into the layer of water located beneath the oil. The gel in globular form was conducted out of the bottom of the column in a stream of water and on removal from the water, it was washed with petroleum naphtha to remove oil from its surface. It was then washed with water and $NH_4Cl$ solution to replace zeolitically-held sodium ions by ammonium ions which are capable of being driven off as $NH_3$ by heat. The gel was dried slowly and uniformly at 180° F. until shrinkage was substantially complete and the drying was continued at a gradually increasing temperature up to about 1050° F. at which temperature it was maintained for two hours. The silica-alumina gel retained its spheroidal shape during the washing and drying operations.

The pellets so obtained were found to be very efficient catalysts for the conversion of petroleum gas oil to gasoline.

It will be readily understood that commercial operation will preferably involve a plurality of nozzles, each with its divider. A battery of this type may utilize a single body of oil for each divider or a number of dividers may discharge into one large body of oil.

The apparatus of Figure 4 may be advantageously used in the preparation of solid spheroidal particles by cooling solidification of a fused solid. Thus a material such as slag, fused alumina or other vitreous material may be introduced by pipe 25 to flow over a graphite cone 20 into a liquid bath maintained at a temperature below the solidification point of the solid to be produced. Any suitable cooling means may be employed to maintain the temperature of the bath. In the example shown, the chamber 10 is uninsulated and losses of heat to the atmosphere compensate for heat put into the bath by the solid introduced by pipe 25. If evaporation of the liquid bath occurs the vapors will be condensed against the top of the chamber and returned to the bath.

The solid particles are withdrawn from the bottom of the chamber by falling into an eductor 29 having a pipe 30 for introducing a flow of liquid to the eductor and a pipe 31 for withdrawing the liquid so introduced together with entrained solid globules.

As an example of use of the chamber of Figure 4, pellets of blast furnace slag are produced by feeding molten slag through pipe 25 over a graphite cone into a bath of molten magnesium maintained at a temperature below the melting point of the slag. The stream of molten magnesium is introduced to the eductor through pipe 30 under a pressure to maintain the heighth of the magnesium body in the chamber and molten magnesium containing entrained slag spheroids is withdrawn by pipe 31 to a suitable separating device such as a screen which retains the slag globules permitting the molten magnesium to drain off for return. Care must be exercised to prevent contact of the metal with air and an atmosphere of inert gas such as nitrogen is preferably maintained above the level of liquid in chamber 10 and in the separating device for that purpose.

It will be apparent that our invention lies in the means of introducing streams of a liquid into a liquid solidifying medium and that it can be applied to any process wherein one liquid is caused to solidify in a bath of another liquid. The nature of the two liquids will be determined in accordance with the knowledge in the art, reference to several typical types of known operation having been given above.

We claim:

1. Apparatus for forming solid spheroids by flowing a solidifiable liquid into a treating liquid which comprises a conical divider rigidly fixed in position with its apex directed upwardly and having a plurality of grooves extending down its sides from the apex, means to discharge a stream of liquid onto the apex of said divider and means to maintain a body of another liquid below said divider at a level not substantially below the base of said divider.

2. In combination, means for enclosing a body of liquid, supply means for discharging a stream of gellable colloidal solution above said liquid and a conical divider rigidly fixed in position with its apex adjacent said supply means and its base adjacent said liquid, said divider having a plurality of grooves extending radially down its surface from the apex thereof to the edge of said base, the surface of said divider consisting of a water repellent substance.

3. In combination, means for enclosing a body of liquid, supply means for discharging a stream of gellable colloidal solution above said liquid and a conical divider rigidly fixed in position with its apex adjacent said supply means and its base adjacent said liquid, said divider having 20 to 30 grooves extending radially down its surface from the apex to the edge of the base thereof, the surface of said divider consisting of a water repellent substance.

HENRY G. DALEY.
JOHN W. PAYNE.
EDMUND L. SARGENT.

REFERENCES CITED

The following references are of record in the file of this patent:

UNITED STATES PATENTS

| Number | Name | Date |
| --- | --- | --- |
| 1,092,538 | Rauch | Apr. 7, 1914 |
| 2,238,204 | Woods | Apr. 15, 1941 |
| 2,384,455 | Daley | Sept. 11, 1945 |
| 2,385,217 | Marisic | Sept. 18, 1945 |

FOREIGN PATENTS

| Number | Country | Date |
| --- | --- | --- |
| 457,707 | Great Britain | Dec. 3, 1936 |